United States Patent [19]

Shiga et al.

[11] 4,165,298

[45] Aug. 21, 1979

[54] CATALYSTS FOR THE POLYMERIZATION OF OLEFINS

[75] Inventors: Akinobu Shiga; Yoshiharu Fukui; Kazuhiro Matsumura; Toshio Sasaki; Masahisa Okawa, all of Niihama, Japan

[73] Assignee: Sumitomo Chemical Company, Limited, Osaka, Japan

[21] Appl. No.: 831,630

[22] Filed: Sep. 8, 1977

[30] Foreign Application Priority Data

Sep. 8, 1976 [JP] Japan .................................. 51/108276
Oct. 22, 1976 [JP] Japan .................................. 51/127705

[51] Int. Cl.² ............................................. C08F 4/64
[52] U.S. Cl. ............................. 252/429 B; 526/142; 526/144
[58] Field of Search ................. 252/429 B, 429 C, 441

[56] References Cited

U.S. PATENT DOCUMENTS

| | | | |
|---|---|---|---|
| 3,131,171 | 4/1964 | Calfee | 252/429 B X |
| 3,354,139 | 11/1967 | Vendenberg | 252/429 B X |
| 3,530,107 | 9/1970 | Yoshioka et al. | 252/429 B X |
| 3,701,763 | 10/1972 | Wada et al. | 252/429 B X |
| 3,769,233 | 10/1973 | Helmans et al. | 252/429 C X |
| 3,825,524 | 7/1974 | Wada et al. | 252/429 B X |
| 3,926,933 | 12/1975 | Naylor | 252/429 B X |
| 3,984,350 | 10/1976 | Karayannis et al. | 252/429 B |

FOREIGN PATENT DOCUMENTS 50-112289 9/1975 Japan.
50-143790 11/1975 Japan.

*Primary Examiner*—Patrick Garvin
*Attorney, Agent, or Firm*—Sughrue, Rothwell, Mion, Zinn and Macpeak

[57] ABSTRACT

A solid catalyst for polymerization of olefins prepared by treatment of a titanium trichloride composition with a mixture of (1) a halogen, an interhalogen compound or a halogenated hydrocarbon compound, and (2) an ether which, in combination with organoaluminum compounds as activators, can be used to polymerize olefins for the efficient production of highly crystalline olefin polymers.

34 Claims, No Drawings

CATALYSTS FOR THE POLYMERIZATION OF OLEFINS

BACKGROUND OF THE INVENTION

1. Field of the Invention

This invention relates to a method for the production of highly crystalline olefin polymers.

2. Description of the Prior Art

It is well known that olefins can be polymerized using a Ziegler-Natta catalyst comprising a compound of a transition metal of Groups IV to VI of the periodic table and a metal of Groups I to III of the periodic table or an organo-compound of a metal of Groups I to III of the periodic table. Most commonly, the polymerization is performed at less than about 100° C., and the polymers are obtained in a slurry form.

In this polymerization process, amorphous polymers are formed as by-products in addition to olefin polymers of high stereoregularity which are very valuable industrially.

The amorphous polymer has a low industrial value, and adversely affects the mechanical properties of products formed from the olefin polymers such as films and fibers. Moreover, the formation of the amorphous polymer consumes and thereby wastes the monomeric starting material, and an additional means is required to remove the amorphous polymer. This is a very serious industrial disadvantage.

It can be easily imagined therefore that substantial inhibition of the formation of amorphous polymers would be of great industrial advantage.

Furthermore, in this polymerization process, the catalyst remains as a residue in the resulting olefin polymers, and adversely affects the stability and processability of the polymers. Additional equipment is necessary therefore to remove the residual catalyst and stabilize the polymers.

These disadvantages of the process can be overcome by increasing the activity of the catalyst which is expressed as the yield of olefin polymer per unit weight of catalyst. If the catalytic activity is increased, no equipment for the removal of the residual catalyst is necessary and the manufacturing cost of the olefin polymer can be reduced.

In the production of olefin polymers such as propylene polymers and butene-1 polymers, titanium trichloride is most widely used as the transition metal compound which is a component of the solid catalyst.

The titanium trichloride used for this purpose is obtained by (1) reducing titanium tetrachloride with hydrogen and activating the reduction product by ball-milling, (2) reducing titanium tetrachloride with metallic aluminum, and activating the reduction product by ball-milling [the resulting compound has the general formula $TiCl_3(AlCl_3)_{\frac{1}{3}}$], or (3) reducing titanium tetrachloride with an organoaluminum compound at about $-30°$ C. to about $10°$ C. and heating the resulting solid reduction product to about 120° to about 180° C. to change the crystal form of the solid reduction product.

The catalytic activity of the titanium trichloride thus obtained is not entirely satisfactory and the stereoregularity of the polymers produced is also not entirely satisfactory. Thus various improvements have been attempted.

Japanese Patent Publication No. 92,298/1973, for example, discloses that a titanium trichloride composition obtained by reducing titanium tetrachloride with an organoaluminum compound and heat-treating the reduction product can be improved by pulverizing the titanium trichloride composition in a ball mill together with other compounds, and then extracting and washing the pulverized product with a solvent.

As improved methods for the preparation of a titanium trichloride composition represented by the formula $TiCl_3(AlCl_3)_{\frac{1}{3}}$ hereinafter ($TiCl_3AA$) by reducing titanium tetrachloride with metallic aluminum and pulverizing the reduction product in a ball mill, Japanese Published Patent Application (OPI) Nos. 21777/1973, 3188/1975 and 83781/1974 disclose the ball-milling of $TiCl_3AA$ together with other compounds, and Japanese Published Patent Application (OPI) No. 60182/1973 discloses a method for preparing the solid catalyst by ball-milling $TiCl_3AA$ together with other compounds and then washing the pulverized product with an inert solvent.

All of these improved methods require the pulverization of the titanium trichloride composition in a ball mill, and still the catalysts obtained have insufficient catalytic activity.

It is also known to improve $TiCl_3AA$ by treating the $TiCl_3AA$ with an organoaluminum compound containing bromine or iodine and an alkyl halide, as disclosed in *Die Makromoleculare Chemie*, 176, p. 2159 (1975), and Catalyst, Vol. 18 (No. 2), page 2, 1976.

Japanese Published Patent Application (OPI) Nos. 81889/76 and 117787/76 suggest a method for improving the catalytic performance of $TiCl_3AA$, which comprises treating titanium trichloride with iodine or bromine, or a hydrocarbon compound of iodine or bromine. This method produces some improvement in the stereoregularity of the polymers produced therewith, but substantially no improvement in the catalytic activity.

Further, Japanese Published Patent Application (OPI) No. 143,790/1975 discloses treatment of the solid resulting from the reduction of titanium tetrachloride with aluminum powder or an organoaluminum compound with a mixture of a complexing agent and carbon tetrachloride. The disclosure is that after drop-wise adding an organoaluminum compound to titanium tetrachloride at a temperature of $-10°$ C. to $10°$ C., the reaction may be completed by increasing the temperature of the reaction mixture to 20° to 100° C., but preferably the reaction is completed by maintaining a low temperature without increasing the temperature. Since, however, the solid catalyst thus obtained is very unsatisfactory in terms of catalytic activity and with respect to the stereoregularity of the polymers formed, it is desirable to repeat the carbon tetrachloride treatment once more.

SUMMARY OF THE INVENTION

Extensive studies have been made on the treatment of various kinds of titanium trichloride compositions with a mixture of an ether and a halogen, an interhalogen compound or a halogenated hydrocarbon, and have led to the discovery that solid catalysts obtained by treating the titanium trichloride compositions with the above-described mixture have greatly improved catalytic activity, and polymers produced using these solid catalysts have markedly improved stereoregularity as compared with those disclosed in the prior art references cited hereinabove, that is, in comparison with those resulting from the treatment of titanium trichloride with a halogen, or a halogenated hydrocarbon composition, or in comparison with those resulting from the treatment of the titanium trichloride with an ether. The present invention is based on this finding.

As is illustrated herein below by the Examples and Comparative Examples, the treatment of a titanium trichloride composition with a mixture of an ether compound and a halogen compound or a halogenated hydrocarbon compound is essential for markedly increasing the catalytic activity and the stereoregularity. The improvement is very low if the titanium trichloride composition is treated with a halogen compound or a halogenated hydrocarbon compound alone, or with an ether alone.

A characteristic feature of the improvement obtained using a mixture of an ether with a halogen, an interhalogen compound or a halogenated hydrocarbon compound is that the improvement is very general, and observed in various titanium trichloride compositions. It has been found that the improvement can be enhanced by ball-milling the resulting treated titanium trichloride composition.

An object of this invention is to provide a solid catalyst for the polymerization of olefins which can be used to produce highly crystalline olefin polymers.

Another object of the invention is to provide a method for the production of highly crystalline olefin polymers.

These and other objects and advantages of the present invention will become apparent from the following summary and subsequent description of the invention.

The present invention in one embodiment thus provides a method for producing a solid catalyst which comprises treating a titanium trichloride composition or a pulverized product thereof with a mixture of (1) at least one halogen or halogen compound selected from the group consisting of (a) a halogen expressed by the general formula $$X_2$$

wherein X represents Cl, Br or I, (b) an interhalogen compound expressed by the general formula $$XX'_a$$

wherein X and X', which are different, each represents Cl, Br or I, and a is 1 or 3, and (c) a halogenated hydrocarbon compound expressed by the general formula $$R_3-X$$

wherein $R_3$ represents a straight-chain alkyl group or a branched-chain alkyl group, an alicyclic hydrocarbon group or an aromatic hydrocarbon group, each containing up to 18 carbon atoms but excluding a methyl group, and X represents a halogen atom, and (2) an ether compound expressed by the general formula $$R_1-O-R_2$$

wherein $R_1$ and $R_2$, which may be the same or different, each represents a straight-chain alkyl group or a branched-chain alkyl group, each containing 1 to 8 carbon atoms.

In another embodiment of this invention, the invention provides a method for preparing highly crystalline olefin polymers, which comprises polymerizing olefins in the presence of a catalyst system consisting essentially of (A) the solid catalyst obtained by the above-described method and (B) an activator expressed by the general formula $$R'_e AlY_{3-e}$$

wherein R' represents a straight-chain alkyl group or a branched-chain alkyl group, each containing 1 to 8 carbon atoms, Y represents a halogen atom (Cl, Br or I), a hydrogen atom, or an alkoxy group, and e is a number of from 2 to 3 (i.e., $2 \leq e \leq 3$).

DETAILED DESCRIPTION OF THE INVENTION

The term "halogen atom" as used herein means Cl, Br or I.

Titanium trichloride compositions obtained by various methods can be used in this invention, but those obtained by the following methods are preferred.

(1) A titanium trichloride composition expressed by the general formula $$TiCl_3(AlCl_3)_{\frac{1}{3}}$$

which is prepared by reducing titanium tetrachloride with metallic aluminum and ball-milling the reduction product obtained.

(2) A titanium trichloride composition prepared by reducing titanium tetrachloride with an organoaluminum compound expressed by the general formula $$R_n AlZ_{3-n}$$

where R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3 (i.e., $1 \leq n \leq 3$), optionally, followed by heat-treatment at a temperature of about 100° to about 180° C. in the absence or presence of an inert hydrocarbon.

(3) A titanium trichloride composition prepared by reducing titanium tetrachloride with an organoaluminum compound expressed by the general formula $$R_n AlZ_{3-n}$$

where R represents a straight-chain or branched-chain alkyl group, an alicyclic hydrocarbon group or an aromatic hydrocarbon group, each containing up to 18 carbon atoms, Z represents a halogen atom or a hydrogen atom and n is a number of from 1 to 3 (i.e., $1 \leq n \leq 3$), and treating the reduction product with an aluminum compound expressed by the general formula $$R''_p AlX_{3-p}$$

where R" represents a straight-chain or branched-chain alkyl group, an alicyclic hydrocarbon group, or an aromatic hydrocarbon group, each containing up to 18 carbon atoms, X represents a halogen atom, and p is a number defined by $1 \leq p < 1.5$, optionally followed by treating the product with an ether compound.

(4) A titanium trichloride composition prepared by reducing titanium tetrachloride with an organoaluminum compound expressed by the general formula $R_nAlZ_{3-n}$ where R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3 (i.e., $1 \leq n \leq 3$), treating the reduction product with an ether compound, and treating the resulting ether-treated solid with an aluminum compound expressed by the general formula $R''_pAlX_{3-p}$ where R" represents a straight-chain or branched-chain alkyl group, an alicyclic hydrocarbon group or an aromatic hydrocarbon group, each containing up to 18 carbon atoms, X represents a halogen atom, and p is a number defined by $1 \leq p < 1.5$, optionally followed by treating the product with an ether compound.

(5) A titanium trichloride composition prepared by reducing titanium tetrachloride with an organoaluminum compound expressed by the general formula $R_nAlZ_{3-n}$ where R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3 (i.e., $1 \leq n \leq 3$), treating the reduction product with an ether compound, and treating the resulting ether-treated solid with an aluminum compound expressed by the general formula $R''_pAlX_{3-p}$ where R" represents a straight-chain or branched-chain alkyl group, an alicyclic hydrocarbon group or an aromatic hydrocarbon group, each containing up to 18 carbon atoms, X represents a halogen atom, and p is a number defined by $1 \leq p < 1.5$, in the presence of an organic halogen compound expressed by the general formula $R'''X$ where R''' represents a straight-chain or branched-chain alkyl group, an alicyclic hydrocarbon group or an aromatic hydrocarbon group, each containing up to 18 carbon atoms, and X represents a halogen atom, optionally followed by treating the product with an ether compound.

(6) A titanium trichloride composition prepared by reducing titanium tetrachloride with an organoaluminum compound expressed by the general formula $R_nAlZ_{3-n}$ where R represents a straight-chain or branched-chain alkyl group, an alicyclic hydrocarbon group on an aromatic hydrocarbon group, each containing up to 18 carbon atoms, Z represents a halogen atom or a hydrogen atom, and n is a number of from 1 to 3 (i.e., $1 \leq n \leq 3$), treating the reduction product with an ether compound, and treating the resulting ether-treated solid with an aluminum halide of the general formula $AlX_3$ where X represents a halogen atom, dissolved in an aromatic hydrocarbon in the presence of a hydrogen halide expressed by the general formula $HX$ where X represents a halogen atom, optionally followed by treating the product with an ether compound.

(7) A titanium trichloride composition prepared by reducing titanium tetrachloride with an organoaluminum compound expressed by the general formula $R_nAlZ_{3-n}$ where R represents a straight-chain or branched-chain alkyl group, an alicyclic hydrocarbon group, or an aromatic hydrocarbon group, each containing up to 18 carbon atoms, Z represents a halogen atom or a hydrogen atom, and n is a number of from 1 to 3 (i.e., $1 \leq n \leq 3$), treating the reduction product with an ether, and then treating the product with titanium tetrachloride.

The titanium trichloride compositions obtained by the Methods (2), (3), (4), and (5) are especially preferred for use in this invention.

Examples of organoaluminum compounds expressed by the general formula $R_nAlZ_{3-n}$ wherein R represents a straight-chain or branched-chain alkyl group, an alicyclic hydrocarbon group, or an aromatic hydrocarbon group, each containing up to 18 carbon atoms, Z represents a halogen atom or a hydrogen atom, and n is a number of from 1 to 3 ($1 \leq n \leq 3$) used to reduce titanium tetrachloride in Methods (2), (3), (4), (5), (6), and (7) above include methyl aluminum dichloride, ethyl aluminum dichloride, n-propyl aluminum dichloride, ethyl aluminum sesquichloride, dimethyl aluminum chloride, diethyl aluminum chloride, di-n-propyl aluminum chloride, trimethyl aluminum, triethyl aluminum, triisobutyl aluminum, ethyl dicyclohexyl aluminum, triphenyl aluminum, diethyl aluminum hydride, diisobutyl aluminum hydride, diethyl aluminum bromide, and diethyl aluminum iodide.

Of these compounds, diethyl aluminum chloride and ethyl aluminum sesquichloride provide especially preferred results.

The reduction reaction for obtaining the reduction product is carried out at about −60° C. to about 60° C., preferably −30° C. to 30° C. There is no particular restriction on the reaction time, but the reaction time is usually about 1 to about 10 hours. In order to complete the reaction, an after-reaction at an elevated temperature not exceeding about 100° C. is preferably performed. Preferably, the reduction reaction is carried out in an inert hydrocarbon solvent such as pentane, hexane, heptane, octane or decane.

The reduction product obtained by the above method can be used as the titanium trichloride composition in Method (2). In order to enhance the catalytic performance of the titanium trichloride solid catalyst, the reduction product is preferably heat-treated. The heat-treatment can be performed in the absence of or presence of an inert hydrocarbon solvent. A suitable heat-treatment temperature is about 100° to about 180° C. There is no particular restriction on the heat-treatment time, but usually, periods of 30 minutes to 5 hours are used conveniently.

The ether compound used to treat the reduction product obtained in Methods (4), (5), (6) and (7) described hereinabove is compound expressed by the general formula $$R_1-O-R_2$$

wherein $R_1$ and $R_2$, which may be the same or different, each represents a straight-chain or branched-chain alkyl group containing 1 to 8 carbon atoms.

Specific examples of suitable ether compounds which can be used are diethyl ether, di-n-propyl ether, diisopropyl ether, di-n-butyl ether, diisoamyl ether, dineopentyl ether, di-n-hexyl ether, methyl n-butyl ether, methyl isoamyl ether, and ethyl isobutyl ether.

Of these ether compounds, di-n-butyl ether and diisoamyl ether give especially preferred results.

The treatment of the reduction product with the ether compound is advantageously carried out in the presence of a diluent. Suitable diluents which can be used are inert hydrocarbons such as hexane, heptane, octane, decane, decalin, benzene, toluene and xylene.

The amount of the ether compound used is about 0.05 to about 3.0 moles, preferably 0.5 to 1.5 moles, per mole of titanium trichloride present in the reduction product.

The treatment temperature is desirably about 0° to about 100° C. There is no particular limitation on the treatment time, but periods of about 20 minutes to about 5 hours are used conveniently.

The aluminum compound expressed by the general formula $$R''_p AlX_{3-p}$$

wherein $R''$ represents a straight-chain or branched-chain alkyl group, an alicyclic hydrocarbon group or an aromatic hydrocarbon group, each containing up to 18 carbon atoms, X represents a halogen atom, and p is a number defined by $1 \leq p < 1.5$, used to treat the reduction product and the ether-treated solid in Methods (3), (4) and (5) above are preferably alkyl aluminum dihalides. Alkyl aluminum dichlorides provide especially preferred results.

Specific examples of aluminum compounds which can be used include methyl aluminum dichloride, ethyl aluminum dichloride, n-propyl aluminum dichloride, n-butyl aluminum dichloride, n-hexyl aluminum dichloride, n-octyl aluminum dichloride, phenyl aluminum dichloride, o-tolyl aluminum dichloride, cyclohexyl aluminum dichloride, methyl aluminum dibromide, ethyl aluminum dibromide, phenyl aluminum dibromide, and methyl aluminum diiodide.

Of these aluminum compounds, ethyl aluminum dichloride provides especially advantageous results.

These aluminum compounds may be used individually or as a mixture of two or more thereof.

The treatment with the aluminum compound may be carried out in the absence of or presence of a diluent.

Suitable diluents which can be used are inert hydrocarbons such as hexane, heptane, octane, decane, decalin, benzene, toluene, and xylene.

There is no particular restriction on the reaction temperature, but the temperature is usually from room temperature (e.g., about 20°–30° C.) to 200° C., preferably from 50° to 180° C.

The reaction time is also not particularly restricted, but usually, periods of from about 30 minutes to about 5 hours are used conveniently.

When the titanium trichloride composition is to be produced by Method (3) described hereinabove, a method may be employed which comprises reducing titanium tetrachloride with an organoaluminum compound expressed by the general formula $$R_n AlZ_{3-n}$$

wherein R, Z and n are as described above, and without washing the reduction product with an inert hydrocarbon solvent, immediately heat-treating the reaction mixture at a temperature of about 50° to about 180° C.

Preferred organic halogen compounds expressed by the general formula $$R'''X$$

wherein $R'''$ represents a straight-chain or branched-chain alkyl group, an alicyclic hydrocarbon group or an aromatic hydrocarbon group, each containing up to 18 carbon atoms, and X represents a halogen atom, are those in which $R'''$ represents an alkyl or aralkyl group.

Specific examples of organic halogen compounds which can be used are methyl chloride, ethyl chloride, methyl bromide, ethyl bromide, n-butyl chloride, n-butyl bromide, n-hexyl chloride, n-hexyl bromide, tert-butyl chloride, sec-butyl chloride, chlorocycloheptane, chlorobenzene, bromobenzene, benzyl chloride, and benzyl bromide.

Suitable aluminum halides used dissolved in an aromatic hydrocarbon in the presence of a hydrogen halide expressed by the general formula $$HX$$

where X represents a halogen atom, to treat the ether-treated solid in Method (6) above include, for example, aluminum chloride, aluminum bromide and aluminum iodide.

Specific examples of the aromatic hydrocarbons which can be used are benzene, toluene, xylene, ethylbenzene, 1,3,5-trimethylbenzene, monochlorobenzene, and mixtures of these aromatic hydrocarbons.

In dissolving the aluminum halide, a hydrogen halide expressed by the formula $$HX$$

wherein X is a halogen atom, such as hydrogen chloride, hydrogen bromide or hydrogen iodide, must also be present. The dissolution of the aluminum halide can be performed at any temperature from room temperature to about 200° C.

The concentration of the aluminum halide suitably ranges from about 1% to about 80% generally because the effect thereof is not sufficient at a concentration of less than about 1% by weight, and concentrations of more than about 80% by weight are commercially disadvantageous.

The treating temperature can be varied from about $-100°$ C. to about 200° C.

The treating time is not particularly restricted, but usually periods of about 5 minutes to about 5 hours are used conveniently.

In Methods (3), (4), (5) and (6) respectively described above, the product obtained by treating the reduction product with the aluminum compound, the product obtained by treating the ether-treated solid with the aluminum compound, the product obtained by treating the ether-treated solid with the aluminum compound in the presence of the organic halogen compound, and the product obtained by treating the ether-treated solid with the aluminum halide may be treated further with an ether compound. This ether compound can be selected from those ether compounds described above used to treat the reduction product.

Advantageously, the optional treatment with the ether compound is carried out in the presence of a diluent. Suitable diluents which can be used are inert hydrocarbon compounds such as hexane, heptane, octane, decane, decalin, benzene, toluene, and xylene.

The amount of the ether compound used is about 0.05 to about 3.0 moles per mole of titanium trichloride present in the solid.

The treating temperature is desirably about 0° to about 100° C. There is no particular restriction on the reaction time, but usually periods of about 20 minutes to about 5 hours are conveniently used.

In the preparation of the titanium trichloride composition by Method (7), the final step of treatment with titanium tetrachloride is advantageously carried out in the present of a diluent. The concentration of the titanium tetrachloride is preferably about 10% by volume to about 70% by volume in general. The treatment temperature ranges from room temperature to about 100° C., preferably from 50° C. to 80° C. A suitable treating time ranges from about 30 minutes to about 4 hours.

According to the method of this invention, the titanium trichloride composition thus obtained is then treated with a mixture of (1) at least one halogen or halogen compound selected from the group consisting of (a) a halogen expressed by the general formula $$X_2$$

wherein X represents Cl, Br or I, (b) an interhalogen compound expressed by the general formula $$XX'_a$$

wherein X and X', which are different, each represents Cl, Br or I, and a is 1 or 3, (c) a halogenated hydrocarbon compound expressed by the general formula $$R_3-X$$

wherein $R_3$ represents a straight-chain or branched-chain alkyl group, an alicyclic hydrocarbon group or an aromatic hydrocarbon group, each containing up to 18 carbon atoms but excluding a methyl group and X represents a halogen atom, and (2) an ether compound expressed by the general formula $$R_1-O-R_2$$

wherein $R_1$ and $R_2$, which may be the same or difference, each represent a straight-chain or branched-chain alkyl group containing 1 to 8 carbon atoms.

The mechanism by which a marked improvement in catalytic activity and stereoregularity of the polymers produced therewith is achieved by the above-described treatment of titanium trichloride compositions is not completely clear, but a characteristic feature is that the treating effect is very general and works on various types of titanium trichloride compositions.

In the above treatment, the presence of an ether compound is essential, and, as will be shown by the Examples and Comparative Examples to be given hereinbelow, in the absence of the ether compound, there is no effect of increasing the catalytic activity of the titanium trichloride solid composition.

The halogen used in the above-described treatment includes chlorine, bromine, and iodine. Examples of the interhalogen compounds which can be used are bromine chloride, iodine chloride, iodine trichloride, and iodine bromide.

Suitable halogenated hydrocarbon compounds are, for example, straight-chain or branched-chain alkyl halides, alicyclic hydrocarbon halides, aromatic hydrocarbon halides, and aralkyl halides. The straight-chain or branched-chain alkyl halides provide preferred results. Of these alkyl halides, straight-chain and branched-chain primary alkyl halides, and straight-chain and branched-chain secondary alkyl halides provide especially preferred results.

Specific examples of halogenated hydrocarbon compounds of the general formula $$R_3-X$$

wherein X is as described above which can be used include ethyl chloride, ethyl bromide, ethyl iodide, n-propyl chloride, n-propyl bromide, n-propyl iodide, n-butyl chloride, n-butyl bromide, n-butyl iodide, n-amyl chloride, n-amyl bromide, n-amyl iodide, n-hexyl chloride, n-hexyl bromide, n-hexyl iodide, n-octyl chloride, n-octyl bromide, n-decyl chloride, n-decyl bromdie, stearyl chloride, isobutyl chloride, isobutyl bromide, isobutyl iodide, isoamyl chloride, isoamyl bromide, isoamyl iodide, 2-ethylhexyl chloride, 2-ethylhexyl bromide, 2-ethylhexyl iodide, isopropyl chloride, isopropyl bromide, isopropyl iodide, sec-butyl chloride, sec-butyl bromide, sec-butyl iodide, sec-amyl iodide, tert-butyl chloride, tert-butyl bromide, tert-butyl iodide, cyclohexyl chloride, cyclohexyl bromide, cyclohexyl iodide, monochlorobenzene, monobromobenzene, monoiodobenzene, o-dichlorobenzene, α-naphthyl chloride, benzyl bromide, and benzyl iodide. Of these compounds, n-butyl iodide provides the most preferred results.

Of the above halogens and halogen compounds, iodine provides the most preferred results.

Desirably, the treatment of the titanium trichloride composition with the above-described mixture of (1) and (2) is carried out in a hydrocarbon solvent such as hexane, heptane, octane, decane, benzene, toluene or xylene. The solvent can be selected depending on the reactivity of the halogen or halogen compound and the treatment conditions used.

The treatment may be carried out using various procedures, for example, (i) a procedure comprising mixing the halogen or halogen compound (1) with the ether compound (2) and then adding the titanium trichloride composition to the mixture, or (ii) a procedure comprising contacting the titanium trichloride composition with the ether compound (2), and then adding the halogen or halogen compound (1). The treatment can also be performed by ball milling.

The amount of the halogen or halogen compound used, which varies depending on the properties thereof, the properties of the titanium trichloride composition and the treatment conditions, is usually about 0.001 to about 2.0 moles, preferably 0.005 to 1.0 mole, per mole of titanium trichloride in the titanium trichloride composition. If the amount of the halogen or halogen compound is less than about 0.001 mole, a sufficient improvement can not be achieved. If, on the other hand, the amount of the halogen or halogen compound is greater than about 2.0 moles, the yield of the resulting solid catalyst decreases, which is wasteful, and no significant benefit can be obtained.

The ether compound (2) to be used together with the halogen or halogen compound (1) may be selected from those ether compounds reacted with the reduction product of titanium tetrachloride. Di-n-butyl ether and diisoamyl ether provide the most preferred results.

The amount of the ether compound (2) used is about 0.001 to about 5.0 moles, preferably 0.005 to 3.0 moles, per mole of titanium trichloride in the titanium trichloride composition.

The temperature at which the titanium trichloride composition is treated with the mixture of the halogen or halogen compound (1) and the ether compound (2) can be optionally chosen, but is preferably from about $-30°$ C. to about 200° C., more preferably from 0° C. to 150° C.

The treating time is also not particularly restricted, but usually, periods of from about 5 minutes to about 5 hours are conveniently used.

The improvement is further increased if the treatment of the titanium trichloride composition with the mixture of the halogen or halogen compound (1) and the ether compound (2) is performed after pulverizing the titanium trichloride composition. The pulverization is carried out in an atmosphere of an inert gas such as nitrogen or argon which is shielded from air and moisture.

The term "treatment" referred to herein means the operation of bringing the solid titanium trichloride into contact with a treating agent to react the solid titanium trichloride therewith, and separating the resulting solid by washing and filtration. Suitable washing media which can be used include inert hydrocarbon solvents, for example those described above as suitable diluents.

The treating time and the treating temperature referred to herein mean the time and temperature which are required to bring solid titanium trichloride into contact with the treating agent.

The pulverization of the titanium trichloride composition can be performed using various conventional methods, for example, methods using a ball mill, a impact mill, or a vibratory mill.

The pulverizing time and the pulverizing temperature differ depending on the properties and the type of pulverization. Usually, the pulverizing time is about 30 minutes to about 500 hours, and the temperature at the time of pulverization is about $-78°$ C. to about 150° C.

Examples of activators of the general formula

where R′ represents a straight-chain or branched-chain alkyl group containing 1 to 8 carbon atoms, Y represents a halogen atom or a hydrogen atom or an alkoxy group, and e is a number of from 2 to 3 ($2 \leq e \leq 3$) which can be used in this invention for polymerizing olefins include dimethyl aluminum chloride, diethyl aluminum chloride, diisobutyl aluminum chloride, diethyl aluminum bromide, diethyl aluminum iodide, trimethyl aluminum, triethyl aluminum, diethyl aluminum hydride, and diethyl aluminum ethoxide. Of these activators, diethyl aluminum chloride is especially preferred.

The molar ratio of the titanium trichloride solid catalyst (calculated as titanium trichloride present in the solid) to the activator ranges from about 10:1 to about 1:500, preferably 2:1 to 1:200.

In the polymerization, a Lewis base which has heretofore been used to improve the stereoregularity of the resulting olefin polymers obtained may be used as a third component in addition to the combination of the solid titanium trichloride catalyst and the activator. The optimum amount of the Lewis base, which differs depending on the type of the Lewis base is usually about 0.01 to about 2 moles, preferably 0.05 to 1 mole, per mole of the titanium trichloride in the solid catalyst. The use of an unsaturated carboxylic acid ester as a third component together with the above described solid catalyst is preferred because the amount of by-product soluble polymer is reduced without decreasing the polymerization activity of the catalyst. Examples of unsaturated carboxylic acid esters which can be used are methyl acrylate, methyl methacrylate, methyl maleate, methyl itaconate, ethyl acrylate, and butyl methacrylate. Methyl methacrylate is especially preferred.

The polymerization can be performed at a temperature of from about $-30°$ C. to about 200° C. Usually, however, temperatures of 0° to 100° C. are preferred because at a temperature lower than 0° C., the rate of polymerization tends to decrease, and at a temperature above 100° C., highly stereoregular polymers are not obtained.

There is no particular restriction on the polymerization pressure, but for commercial and economic reasons, pressures of about 3 to about 100 atmosphere are desirable.

The polymerization can be performed either in a continuous manner or in a batchwise manner.

The olefins to which the present invention is applicable are those containing 2 to 10 carbon atoms, for example, ethylene, propylene, butene-1, pentene-1, and 4-methylpentene-1. The invention, however, should not be interpreted as being limited to these exemplified compounds.

The olefin polymerization can be either a homopolymerization or a copolymerization.

In copolymerization, two or more olefins are mixed and contacted with the catalyst system to form copolymers. In order to obtain highly stereoregular copolymers, the mixing ratio of two olefins is desirably such that the proportion of one of the olefins is not more than about 10 mol %.

Heteroblock copolymerization in two or more stages can also be easily performed.

Suitable methods of polymerization include slurry polymerization in which an inert hydrocarbon solvent such as butane, pentane, hexane, heptane or octane is used, or the polymerization can be performed without using a solvent.

The following Examples and Comparative Examples are given to further illustrate the present invention. It should be noted however that the invention is in no way to be construed as being limited to these examples. In these examples, the molar ratio of the reduction product of titanium tetrachloride or the titanium trichloride composition to the treating agent is calculated on the basis of the titanium trichloride present in the reduction product or the titanium trichloride composition.

Unless otherwise indicated herein, all parts, percents, ratios and the like are by weight.

EXAMPLE 1

TiCl$_3$AA (a product of Toho Titanium Kabushiki Kaisha; 12.0 g) was suspended in 60.0 cc of toluene, and 0.10 mole and 1.0 mole, respectively, per mol of TiCl$_3$AA, of iodine and diisoamyl ether were added. They were treated at 100° C. for 1 hour.

After the treatment, the supernatant liquid was removed and the residue was washed twice with 30 cc of toluene and twice with 30 cc of heptane, dried and divided into small portions for use in polymerization.

The resulting catalyst is designated a solid titanium trichloride catalyst.

Polymerization of Propylene (a) Polymerization Method 1:

A 5-liter stainless steel autoclave with a stirrer was purged with nitrogen, and then charged with 1.5 liters of dry heptane, 3.0 g of diethyl aluminum chloride and 180 mg of the solid titanium trichloride catalyst obtained above, and hydrogen in an amount corresponding to a partial pressure of 0.16 kg/cm$^2$ was added.

The temperature of the autoclave was increased to 70° C., and propylene was introduced to a pressure of 6 kg/cm$^2$ to start the polymerization. While supplying fresh propylene so as to maintain this pressure of 6 kg/cm$^2$, the polymerization was continued for 4 hours.

After the polymerization, the introduction of propylene was stopped, and the unreacted propylene was purged. Butanol (100 cc) was added to decompose the catalyst.

The resulting polymer was filtered with a Buchner filter, washed three times with 500 cc of heptane, and dried at 60° C. to obtain 230 g of polypropylene.

Heptane was removed from the filtrate by steam distillation, and 8 g of an amorphous polymer was obtained.

The proportion of the heptane-insoluble portion (%, to be referred to hereinafter as HIP) in the total polymer obtained was 96.5%, and the boiling heptane insoluble portion (to be referred to hereinafter as II) of the HIP portion was 99.0%.

The value IY=(HIP/100)×(II/100)×100 was 95.7.

The R$_p$ (g polypropylene/g TiCl$_3$·hr) expressed by the amount of the polymer per g of TiCl$_3$ solid catalyst per hour was 331.

The polymer had an intrinsic viscosity (to be referred to hereinafter as [η]), measured at 135° C. in tetralin, of 1.95.

(b) Polymerization Method 2:

A 5-liter stainless steel autoclave with a stirrer was purged with nitrogen, and then charged with 3.0 g of diethyl aluminum chloride, and 87 mg of the solid titanium trichloride catalyst obtained above, and hydrogen was added in an amount corresponding to a partial pressure of 0.53 kg/cm$^2$.

Then, 1.4 kg of liquid propylene was introduced under pressure into the autoclave, and polymerized for 4 hours while maintaining the temperature of the autoclave at 70° C.

After the polymerization, the unreacted propylene was purged, and 100 cc of methanol was added to decompose the catalyst.

The polymer obtained was separated by filtration on a Buchner filter, and dried at 60° C. under reduced pressure. Thus, 463 g of polypropylene was obtained.

The R$_p$ and IY, expressing the polymerization activity of the solid titanium trichloride catalyst, were 1330 and 96.2, respectively.

COMPARATIVE EXAMPLE 1

Propylene was polymerized in accordance with Polymerization Method 2 of Example 1 using 97 mg of TiCl$_3$AA and 3.0 g of diethyl aluminum chloride as a polymerization catalyst.

The R$_p$ and IY, expressing the polymerization activity of the solid titanium trichloride composition, were 750 and 91.5, respectively.

COMPARATIVE EXAMPLE 2

TiCl$_3$AA (9.9 g) was treated in the same manner as in Example 1 except that diisoamyl ether was not used.

Using the resulting catalyst, propylene was polymerized in accordance with Polymerization Method 2 of Example 1.

R$_p$=630; IY=92.2.

The shapes of the particles of the polymers were quite irregular as compared with the polymers obtained in Example 1 and Comparative Example 2.

COMPARATIVE EXAMPLE 3-1

TiCl$_3$AA (12.5 g) was suspended in 50 cc of toluene, and reacted at 100° C. for 1 hour, washed, and dried in a similar manner to that used in Example 1. Using the resulting TiCl$_3$AA solid catalyst, propylene was polymerized in accordance with Polymerization Method 2 of Example 1.

R$_p$=770; IY=91.7

COMPARATIVE EXAMPLE 3-2

TiCl$_3$AA (13.3 g) was suspended in 50 cc of toluene, and 1 mole, per mol of TiCl$_3$AA, of diisoamyl ether was added. They were treated at 100° C. for 1 hour. The treated product was washed and dried. Using the resulting solid TiCl$_3$AA catalyst, propylene was polymerized in accordance with Polymerization Method 2 of Example 1.

R$_p$=880; IY=92.2

EXAMPLES 2 TO 8

Solid titanium trichloride catalysts were prepared in the same manner as in Example 1 except that the treating conditions for the TiCl$_3$AA were changed as shown in Table 1 below. Using each of these catalysts, propylene was polymerized in accordance with Polymerization Method 2 of Example 1. The results obtained are shown in Table 1 below.

Table 1

Conditions for the Preparation of Solid Titanium Catalyst

| Example | X₂ or XX'ₐ (X) | Ether Compound (C) | Solvent | Temperature (°C.) | Time (hr) | TiCl₃/X/C (molar ratio) | Polymerization Results | |
|---|---|---|---|---|---|---|---|---|
| | | | | | | | $R_p$ | IY |
| 2 | I₂ | (i-Am)₂O | Toluene | 60 | 1 | 1/0.10/1.0 | 1220 | 95.3 |
| 3 | " | " | " | 40 | 1 | 1/0.15/1.0 | 1200 | 95.2 |
| 4 | " | " | " | 60 | 1 | 1/0.50/1.0 | 1410 | 95.4 |
| 5 | " | (n-Bu)₂O | " | 100 | 1 | 1/0.10/1.0 | 1300 | 95.8 |
| 6 | Br₂ | (i-Am)₂O | n-heptane | 50 | 1 | 1/0.05/1.0 | 940 | 95.0 |
| 7 | Cl₂ | " | " | 60 | 1 | 1/0.05/1.0 | 930 | 94.3 |
| 8 | ICl | " | " | 60 | 1 | 1/0.10/1.0 | 950 | 95.7 |

Note:
i-Am = iso-amyl and n-Bu = n-butyl

EXAMPLE 9

TiCl₃AA (11.2 g) was suspended in 56 cc of toluene, and 0.50 mole and 1.0 mole, respectively, per mole of TiCl₃AA, of n-butyl iodide and diisoamyl ether were added. They were treated at 60° C. for 1 hour. After the treatment, the product was washed, and dried in a similar manner to that used in Example 1. Using the resulting solid titanium trichloride catalyst, propylene was polymerized in accordance with Polymerization Method 2 of Example 1.

$R_p$=1210, IY=95.7

COMPARATIVE EXAMPLE 4

TiCl₃AA was treated in the same manner as in Example 9 except that diisoamyl ether was not used.

Propylene was polymerized in accordance with Polymerization Method 2 of Example 1 using the resulting solid titanium trichloride catalyst.

$R_p$=723, IY=93.0

EXAMPLES 10 TO 16

Solid titanium trichloride catalysts were prepared in the same manner as in Example 9 except that the treating conditions for TiCl₃AA were changed as shown in Table 2 below. Using each of the resulting catalysts, propylene was polymerized in accordance with Polymerization Method 2 of Example 1. The results obtained are shown in Table 2 below.

Table 2

Conditions for the Preparation of Solid Titanium Catalyst

| Example | Halogenated Hydrocarbon (X) | Ether Compound (C) | Solvent | Temperature (°C.) | Time (hr) | TiCl₃/X/C (molar ratio) | Polymerization Result | |
|---|---|---|---|---|---|---|---|---|
| | | | | | | | $R_p$ | IY |
| 10 | n-BuI | (i-Am)₂O | Toluene | 40 | 2 | 1/1.0/1.0 | 1090 | 94.4 |
| 11 | " | (n-Bu)₂O | Heptane | 60 | 2 | 1/1.0/1.0 | 1170 | 95.9 |
| 12 | n-BuBr | (i-Am)₂O | Toluene | 60 | 2 | 1/0.5/1.0 | 1150 | 95.2 |
| 13 | " | " | " | 80 | 2 | 1/0.2/1.0 | 1100 | 95.4 |
| 14 | EtI | " | " | 60 | 2 | 1/0.5/1.0 | 1210 | 95.9 |
| 15 | sec-BuI | " | " | 60 | 2 | 1/0.5/1.0 | 1150 | 95.8 |
| 16 | i-BuI | " | " | 60 | 2 | 1/0.5/1.0 | 990 | 94.8 |

Note:
Et = ethyl; sec-Bu = sec-butyl

EXAMPLE 17

(a) Catalyst Preparation Method 1 (preparation of the reduction product):

A 1-liter reactor was purged with argon, and then charged with 200 cc of dry hexane and 50 cc of titanium tetrachloride. The solution was maintained at −5° C.

Then a solution of 150 cc of dry hexane and 58 cc of diethyl aluminum chloride was added dropwise thereto so that the temperature of the reaction system was maintained at −3° C.

After the addition, the solution was stirred for an additional 30 minutes. The temperature was increased to 70° C., and the stirring was continued further for 1 hour.

The resulting product was allowed to stand, and the reduction product was separated using a solid-liquid separating technique. The solid was washed with 200 cc of hexane to obtain 74.0 g of the reduction product which contained 4.60% by weight of Al.

(b) Catalyst Preparation Method 2 [preparation of Titanium Trichloride Composition (A)]:

Seventy grams of the reduction product obtained by Catalyst Preparation Method 1 of Example 17 was suspended in n-decane, and heat-treated at 140° C. for 2 hours while the slurry concentration was maintained at 0.2 g/cc.

After the treatment, the supernatant liquid was removed, and the residue was washed twice with 200 cc of hexane to obtain a titanium trichloride composition. The resulting titanium trichloride composition is designated Titanium Trichloride Composition (A).

(c) Catalyst Preparation Method 3 [treatment of Titanium Trichloride Composition (A)]:

Titanium Trichloride Composition (A) (11.0 g) obtained in Catalyst Preparation Method 2 of Example 17 was suspended in 55.0 cc of toluene, and iodine and diisoamyl ether were added in such amounts that the molar ratio of the TiCl₃ Composition (A):I:diisoamyl ether was 1:0.10:1.0. They were treated at 80° C. for 1 hour to obtain a solid titanium trichloride catalyst.

Polymerization of Propylene:

Propylene was polymerized in accordance with Polymerization Method 2 of Example 1 using the solid titanium trichloride catalyst prepared in Catalyst Preparation Method 3 of Example 17.

The $R_p$ and IY, expressing the polymerization activity of the titanium trichloride catalyst, were 1380 and 96.5, respectively.

COMPARATIVE EXAMPLE 5-1

Propylene was polymerized in accordance with Polymerization Method 2 of Example 1 using the reduction product obtained in Catalyst Preparation Method 1 of Example 17.
$R_p = 658$, IY = 78.0

COMPARATIVE EXAMPLE 5-2

Propylene was polymerized in accordance with Polymerization Method 2 of Example 1 using Titanium Trichloride Composition (A) obtained in Catalyst Preparation Method 2 of Example 17.
$R_p = 764$, IY = 90.9

COMPARATIVE EXAMPLE 6-1

Titanium Trichloride Composition (A) was treated in the same manner as in Catalyst Preparation Method 3 of Example 17 except that diisoamyl ether was not used.

Using the resulting solid titanium trichloride catalyst, propylene was polymerized in accordance with Polymerization Method 2 of Example 1.
$R_p = 742$, IY = 93.9

COMPARATIVE EXAMPLE 6-2

Titanium Trichloride Composition (A) was treated in the same manner as in Catalyst Preparation Method 3 of Example 17 except that iodine was not used.

Using the resulting solid titanium trichloride catalyst, propylene was polymerized in accordance with Polymerization Method 2 of Example 1.
$R_p = 810$, IY = 91.9

EXAMPLE 18

Titanium Trichloride Composition (A) (11.0 g) obtained in Catalyst Preparation Method 2 of Example 17 was suspended in 55 cc of toluene, and n-butyl iodide and diisoamyl ether were added in such amounts that the molar ratio of the TiCl$_3$ Composition (A):n-butyl iodide:diisoamyl ether was 1:0.5:1.0. They were treated at 60° C. for 1 hour. The resulting treated product was washed and dried in a similar manner to that used in Example 1 to obtain a solid titanium trichloride catalyst.

Using the solid titanium trichloride catalyst, propylene was polymerized in accordance with Polymerization Method 2 of Example 1.
$R_p = 1250$, IY = 96.3

EXAMPLE 19

(a) Catalyst Preparation Method 1 [ball-milling treatment of Titanium Trichloride Composition (A)]:

Titanium Trichloride Composition (A) (33.5 g) obtained in Catalyst Preparation Method 2 of Example 17 was fed into a ball mill under an atmosphere of argon together with 200 stainless steel balls, each having a diameter of 10 mm, and ball-milled for 72 hours at room temperature.

The resulting solid catalyst is designated Ball-Milled Catalyst (A).

(b) Catalyst Preparation Method 2:

Ball-Milled Catalyst (A) (11.5 g) obtained in Catalyst Preparation Method 1 of Example 19 was suspended in 57.5 cc of toluene, and 0.10 mole and 1.0 mole respectively, per mole of Ball-Milled Catalyst (A), of iodine and isoamyl ether were added. They were treated at 60° C. for 1 hour.

After the treatment, the supernatant liquid was removed, and the residue was washed twice with 30 cc of toluene and twice with 30 cc of hexane, dried, and divided into small portions for use in polymerization.

Polymerization of Propylene:

Using the solid titanium trichloride catalyst obtained in Catalyst Preparation Method 2 of Example 19, propylene was polymerized in accordance with Polymerization Method 2 of Example 1.
$R_p = 2030$, IY = 96.3

COMPARATIVE EXAMPLE 7

Using Ball-Milled Catalyst (A) obtained in Catalyst Preparation Method 1 of Example 19, propylene was polymerized in accordance with Polymerization Method 2 of Example 1.
$R_p = 940$, IY = 90.0

EXAMPLE 20

(a) Catalyst Preparation Method 1:

The reduction product (107 g) obtained in Catalyst Preparation Method 1 of Example 17 was added to a solution of 321 cc of n-decane and 214 cc of ethyl aluminum dichloride, and treated at 125° C. for 2 hours.

After the treatment, the supernatant liquid was removed, and the residue was washed three times with 300 cc of hexane, dried, and divided into small portions for use in polymerization.

The resulting titanium trichloride composition is designated Titanium Trichloride Composition (B).

(b) Catalyst Preparation Method 2:

Titanium Trichloride Composition (B) (15.0 g) prepared in Catalyst Preparation Method 1 of Example 20 was suspended in 75.0 cc of toluene, and 0.10 mole and 1.0 mole, respectively, per mole of Titanium Trichloride Composition (B) of iodine and diisoamyl ether were added. They were treated at 100° C. for 1 hour.

After the treatment, the supernatant liquid was removed, and the residue was washed twice with 30 cc of toluene and twice with 30 cc of heptane, dried, and divided into small portions for use in polymerization.

Using the resulting solid titanium trichloride composition, propylene was polymerized in accordance with Polymerization Method 2 of Example 1.
$R_p = 1970$, IY = 96.3, $[\eta] = 1.99$

COMPARATIVE EXAMPLE 8

Propylene was polymerized in accordance with Polymerization Method 2 of Example 1 using Titanium Trichloride Composition (B) obtained in Catalyst Preparation Method 1 of Example 20.
$R_p = 970$, IY = 91.8

EXAMPLE 21

Titanium Trichloride Composition (B) obtained in Catalyst Preparation Method 2 of Example 20 was suspended in 88.5 cc of toluene, and 0.50 mole and 1.0 mole, respectively, per mole of Titanium Trichloride Composition (B), of n-butyl iodide and diisoamyl ether were added. They were treated at 70° C. for 1 hour.

After the treatment, the supernatant liquid was removed, and the residue was washed, and dried in a similar manner to that used in Example 1 to obtain a solid titanium trichloride catalyst.

Using the resulting solid titanium trichloride catalyst, propylene was polymerized in accordance with Polymerization Method 2 of Example 1.

$R_p = 1900$, IY=96.0, $[\eta]=1.99$

EXAMPLE 22

(a) Catalyst Preparation Method 1 [ball-mill treatment-Titanium Trichloride Composition (B)]:

Titanium Trichloride Composition (B) (35 g) obtained in Catalyst Preparation Method 1 of Example 20 was ball-milled in accordance with Catalyst Preparation Method 1 of Example 19.

The resulting solid catalyst is designated Ball-Milled Catalyst (B).

(b) Catalyst Preparation Method 2:

Ball-Milled Catalyst (B) (15.5 g) obtained in Catalyst Preparation Method 1 of Example 22 was suspended in 77.5 cc of xylene, and 0.10 mole and 1.0 mole, respectively, per mole of Ball-Milled Catalyst (B), of iodine and diisoamyl ether were added. They were treated at 60° C. for 1 hour.

After the treatment, the supernatant liquid was removed, and the residue was washed twice with 30 cc of toluene, and twice with 30 cc of hexane, dried, and divided into small portions for used in polymerization.

Polymerization of Propylene:

Using the solid titanium trichloride catalyst obtained in Catalyst Preparation Method 2 of Example 22, propylene was polymerized in accordance with Polymerization Method 2 of Example 1.

$R_P = 2340$, IY=96.7

COMPARATIVE EXAMPLE 9

Propylene was polymerized in accordance with Polymerization Method 2 of Example 1 using Ball-Milled Catalyst (B) obtained in Catalyst Preparation Method 1 of Example 22.

$R_P = 1130$, IY=92.0

EXAMPLE 23

(a) Catalyst Preparation Method 1:

Titanium Trichloride Composition (B) (12.1 g) obtained in Catalyst Preparation Method 1 of Example 20 was suspended in 60.5 cc of dry hexane, and 1 mole, per mole of Titanium Trichloride Composition (B), of diisoamyl ether was added. The mixture was stirred at 40° C. for 1 hour.

After the treatment, the supernatant liquid was removed, and the residue was washed three times with 100 cc of hexane, and dried.

The resulting product is designated Titanium Trichloride Composition (C).

(b) Catalyst Preparation Method 2:

Titanium Trichloride Composition (C) (9.7 g) obtained in Catalyst Preparation Method 1 of Example 23 was suspended in 48.5 cc of toluene, and 0.15 mole and 1.0 mole, respectively, per mole of Titanium Trichloride Composition (C), of iodine and diisoamyl ether were added. They were treated at 80° C. for 1 hour.

After the reaction, the supernatant liquid was removed, and the residue was washed twice with 30 cc of toluene and twice with 30 cc of hexane, dried, and divided into small portions for use in polymerization.

Polymerization of Propylene:

Propylene was polymerized in accordance with Polymerization Method 2 of Example 1 using the solid titanium trichloride catalyst prepared in Catalyst Preparation Method 2 of Example 23.

$R_P = 1770$, IY=96.0

COMPARATIVE EXAMPLE 10

Propylene was polymerized in accordance with Polymerization Method 2 of Example 1 using Titanium Trichloride Composition (C) obtained in Catalyst Preparation Method 1 of Example 23.

$R_p = 1340$, IY=91.7

EXAMPLE 24

(a) Catalyst Preparation Method 1 [ball-mill treatment of Titanium Trichloride Composition (C)]:

Titanium Trichloride Composition (C) obtained in Catalyst Preparation Method 1 of Example 23 was ball-milled in accordance with Catalyst Preparation Method 1 of Example 19.

The resulting solid catalyst is designated Ball-Milled Catalyst (C).

(b) Catalyst Preparation Method 2:

Ball-Milled Catalyst (C) (17.2 g) obtained in Catalyst Preparation Method 1 of Example 24 was suspended in 86.0 cc of toluene, and 0.10 mole and 1.0 mole, respectively, per mole of Ball-Milled Catalyst (C), of iodine and diisoamyl ether were added. They were treated at 60° C. for 1 hour.

After the treatment, the supernatant liquid was removed, and the residue was washed twice with 30 cc of toluene and twice with 30 cc of hexane, dried and divided into small portions for use in polymerization.

Polymerization of Propylene:

Propylene was polymerized in accordance with Polymerization Method 2 of Example 1 using the titanium trichloride solid catalyst obtained in Catalyst Preparation Method 2 of Example 24.

$R_p = 2100$, IY=96.2

COMPARATIVE EXAMPLE 11

Propylene was polymerized in accordance with Polymerization Method 2 of Example 1 using Ball-Milled Catalyst (C) obtained in Catalyst Preparation Method 1 of Example 24.

$R_p = 1300$, IY=91.5

EXAMPLE 25

(a) Catalyst Preparation Method 1 (preparation of an ether-treated solid):

The reduction product (21.2 g) prepared in Catalyst Preparation Method 1 of Example 17 was suspended in 106 cc of dry hexane, and then, 1.2 moles, per mole of the reduction product, of diisoamyl ether was added. The mixture was stirred at 40° C. for 1 hour.

After the treatment, the supernatant liquid was removed, and the residue was washed three times with 100 cc of hexane, and dried.

(b) Catalyst Preparation Method 2 (treatment of the ether-treated solid with ethyl aluminum dichloride):

The ether-treated solid (12.5 g) obtained in Catalyst Preparation Method 1 of Example 25 was added to a solution of 37.5 cc of n-decane and 25.0 cc of ethyl aluminum dichloride, and treated at 125° C. for 2 hours.

After the treatment, the supernatant liquid was removed, and the residue was washed three times with 30 cc of hexane, and dried. The resulting titanium trichloride composition contained 4.18% by weight of Al, and the X-ray pattern thereof showed a peak inherent to δ-type titanium trichloride.

The resulting catalyst is designated Titanium Trichloride Composition (D).

(c) Catalyst Preparation Method 3:

Titanium Trichloride Composition (D) (10.0 g) obtained in Catalyst Preparation Method 2 of Example 25 was suspended in 50.0 cc of toluene, and 0.10 mole and 1.0 mole, respectively, per mole of Titanium Trichloride Composition (D), of iodine and diisoamyl ether were added. They were treated at 100° C. for 1 hour.

After the treatment, the supernatant liquid was removed, and the residue was washed twice with 30 cc of toluene and twice with 30 cc of hexane, dried and divided into small portions.

The peak at $2\theta = 15.1°$ in the X-ray diffraction pattern of the resulting solid titanium trichloride catalyst exhibited a far greater degree of amorphous halo than Titanium Trichloride Composition (D) obtained in Catalyst Preparation Method 2 of Example 25.

Polymerization of Propylene:

Using the solid titanium trichloride catalyst obtained in Catalyst Preparation Method 3 of Example 25, propylene was polymerized in accordance with Polymerization Method 2 of Example 1.

$R_p = 2780$, $IY = 97.2$, $[\eta] = 2.10$

COMPARATIVE EXAMPLE 12

Propylene was polymerized in accordance with Polymerization Method 2 of Example 1 using Titanium Trichloride Composition (D) obtained in Catalyst Preparation Method 2 of Example 25.

$R_p = 1010$, $IY = 92.5$

COMPARATIVE EXAMPLE 13-1

Titanium Trichloride Composition (D) obtained in Catalyst Preparation Method 2 of Example 25 was treated in the same manner as Catalyst Preparation Method 3 of Example 25 except that diisoamyl ether was not used.

Using the resulting solid titanium trichloride catalyst, propylene was polymerized in accordance with Polymerization Method 2 of Example 1.

$R_p = 930$, $IY = 94.5$

COMPARATIVE EXAMPLE 13-2

The titanium trichloride composition obtained in Catalyst Preparation Method 2 of Example 25 was treated under the same conditions as in Catalyst Preparation Method 3 of Example 25 except that iodine was not used.

Using the resulting solid titanium trichloride catalyst, propylene was polymerized in accordance with Polymerization Method 2 of Example 1.

$R_p = 1430$, $IY = 91.6$

EXAMPLE 26

Titanium Trichloride Composition (D) (10.0 g) obtained in Catalyst Preparation Method 2 of Example 26 was suspended in 50 cc of toluene, and 0.5 mole and 1.0 mole, respectively, per mole of Titanium Trichloride Composition (D), of n-butyl iodide and diisoamyl ether were added. They were treated at 100° C. for 1 hour.

After treatment, the product was washed and dried to obtain a solid titanium trichloride catalyst.

The peak at $2\theta = 15.1°$ in the X-ray diffraction pattern of the solid titanium trichloride catalyst exhibited a far greater degree of amorphous halo than Titanium Trichloride Composition (D) obtained in Catalyst Preparation Method 2 of Example 25.

Using the resulting solid titanium trichloride catalyst, propylene was polymerized in accordance with Polymerization Method 2 of Example 1.

$R_p = 2330$, $IY = 96.9$

EXAMPLE 27

(a) Catalyst Preparation Method 1 [ball-mill treatment of Titanium Trichloride Composition (D)]:

Titanium Trichloride Composition (D) obtained in Catalyst Preparation Method 2 of Example 25 was ball-milled in accordance with Catalyst Preparation Method 1 of Example 19.

The resulting solid catalyst is designated Ball-Milled Catalyst (D).

(b) Catalyst Preparation Method 2:

Ball-Milled Catalyst (D) (15.0 g) obtained in Catalyst Preparation Method 1 of Example 27 was suspended in 75.0 cc of xylene, and 0.10 mole and 1.0 mole, respectively, per mole of Ball-Milled Catalyst (D), of iodine and diisoamyl ether were added. They were treated at 120° C. for 2 hours.

After the treatment, the supernatant liquid was removed, and the residue was washed twice with 30 cc of toluene, and twice with 30 cc of hexane, dried, and divided into small portions for use in polymerization.

Polymerization of Propylene:

Using the solid titanium solid catalyst obtained in Catalyst Preparation Method 2 of Example 27, propylene was polymerized in accordance with Polymerization Method 2 of Example 1.

$R_p = 3100$, $IY = 97.4$

COMPARATIVE EXAMPLE 14

Using Ball-Milled Catalyst (D) obtained in Catalyst Preparation Method 1 of Example 27, propylene was polymerized in accordance with Polymerization Method 2 of Example 1.

$R_p = 995$, $IY = 92.2$

EXAMPLE 28

(a) Catalyst Preparation Method 1:

Titanium Trichloride Composition (D) (15.0 g) obtained in Catalyst Preparation Method 2 of Example 25 was suspended in 60.0 cc of hexane, and 1 mole, per mole of Titanium Trichloride Composition (D), of di-n-butyl ether was added. They were treated for 1 hour at 60° C.

After the treatment, the supernatant liquid was removed, and the residue was washed three times with 50 cc of hexane, dried and divided into small portions.

The resulting catalyst is designated Titanium Trichloride Composition (E).

(b) Catalyst Preparation Method 2:

Titanium Trichloride Composition (E) (12.0 g) obtained in Catalyst Preparation Method 1 of Example 28 was suspended in 60.0 cc of toluene, and 0.10 mole and 1.0 mole, respectively, per mol of Titanium Trichloride Composition (E), of iodine and diisoamyl ether were added. They were treated at 100° C. for 1 hour.

After the treatment, the supernatant liquid was removed, and the residue was washed twice with 30 cc of toluene and twice with 30 cc of hexane, dried, and divided into small portions.

Polymerization of Propylene:

Propylene was polymerized in accordance with Polymerization Method 2 of Example 1 using the solid titanium trichloride catalyst prepared in Catalyst Preparation Method 2 of Example 28.
$R_p = 2650$, $IY = 97.2$

COMPARATIVE EXAMPLE 15

Propylene was polymerized in accordance with Polymerization Method 2 of Example 1 using Titanium Trichloride Composition (E) obtained in Catalyst Preparation Method 1 of Example 28.
$R_p = 2010$, $IY = 92.0$

EXAMPLE 29

(a) Catalyst Preparation Method 1 [ball-mill treatment of Titanium Trichloride Composition (E)]:

Titanium Trichloride Composition (E) obtained in Catalyst Preparation Method 1 of Example 28 was ball-milled in accordance with Catalyst Preparation Method 1 of Example 19.

The resulting solid catalyst is designated Ball-Milled Catalyst (E).

(b) Catalyst Preparation Method 2:

Ball-Milled Catalyst (E) (10.3 g) obtained in Catalyst Preparation Method 1 of Example 29 was suspended in 51.5 cc of toluene, and 0.10 mole and 1.0 mole, respectively, per mole of Ball-Milled Catalyst (E), of iodine and diisoamyl ether were added. They were treated at 60° C. for 2 hours.

After the treatment, the supernatant liquid was removed, and the residue was washed twice with 30 cc of toluene and twice with 30 cc of heptane, dried, and divided into small portions.

Polymerization of Propylene:

Using the solid titanium trichloride catalyst obtained in Catalyst Preparation Method 2 of Example 29, propylene was polymerized in accordance with Polymerization Method 2 of Example 1.
$R_p = 2910$, $IY = 97.3$

COMPARATIVE EXAMPLE 16

Propylene was polymerized in accordance with Polymerization Method 2 of Example 1 using Ball-Milled Catalyst (E) obtained in Catalyst Preparation Method 1 of Example 29.
$R_P = 1850$, $IY = 91.9$

EXAMPLE 30

(a) Catalyst Preparation Method:

To a solution of 100 cc of dry xylene and 30 cc of ethyl aluminum dichloride, 0.25 mole, per mole of the ethyl aluminum chloride, of benzyl chloride was added. Then, 32.6 g of the ether-treated solid prepared in Catalyst Preparation Method 1 of Example 25 was added. The mixture was stirred at 120° C. for 2 hours.

After the treatment, the product was allowed to stand. The supernatant liquid was removed, and the residue was washed twice with 100 cc of toluene and twice with 100 cc of hexane, and dried.

The resulting titanium trichloride composition is designated Titanium Trichloride Composition (F).

(b) Catalyst Preparation Method 2:

Titanium Trichloride Composition (F) (15.5 g) obtained in Catalyst Preparation Method 1 of Example 30 was suspended in 77.5 cc of toluene, and 0.07 mole and 0.75 mole, respectively, per mole of Titanium Trichloride Composition (F), of iodine and diisoamyl ether were added. They were treated at 100° C. for 1 hour.

After the treatment, the supernatant liquid was removed, and the residue was washed twice with 30 cc of toluene and twice with 30 cc of hexane, dried, and divided into small portions.

Polymerization of Propylene:

Propylene was polymerized in accordance with Polymerization Method 2 of Example 1 using the solid titanium trichloride catalyst prepared in Catalyst Preparation Method 2 of Example 30.
$R_p = 2690$, $IY = 97.3$

COMPARATIVE EXAMPLE 17

Propylene was polymerized in accordance with Polymerization Method 2 of Example 1 using Titanium Trichloride Composition (F) obtained in Catalyst Preparation Method 1 of Example 30.
$R_p = 1620$, $IY = 94.5$

EXAMPLE 31

Titanium Trichloride Composition (F) (15.0 g) obtained in Catalyst Preparation Method 1 of Example 30 was suspended in 75 cc of toluene, and 0.50 mole and 0.75 mole, respectively, per mole of Titanium Trichloride Composition (F), of n-butyl iodide and diisoamyl ether were added. They were treated at 70° C. for 1 hour. After the treatment, the product was washed, and dried in a similar manner to that used in Example 1 to obtain a solid titanium trichloride catalyst.

Propylene was polymerized in accordance with Polymerization Method 2 of Example 1 using the resulting solid titanium trichloride catalyst.
$R_p = 2510$, $IY = 97.0$

EXAMPLE 32

(a) Catalyst Preparation Method 1 [ball-mill treatment of Titanium Trichloride Composition (F)]:

Titanium Trichloride Composition (F) obtained in Catalyst Preparation Method 1 of Example 30 was ball-milled in accordance with Catalyst Preparation Method 1 of Example 19.

The resulting solid catalyst is designated Ball-Milled Catalyst (F).

(b) Catalyst Preparation Method 2:

Ball-Milled Catalyst (F) (9.8 g) obtained in Catalyst Preparation Method 1 of Example 32 was suspended in 49.0 cc of toluene, and 0.10 mole and 1.0 mole, respectively, per mole of Ball-Milled Catalyst (F), of iodine and diisoamyl ether were added. They were treated at 60° C. for 1 hour.

After the treatment, the supernatant liquid was removed, and the residue was washed twice with 30 cc of toluene and twice with 30 cc of heptane, dried, and divided into small portions.

Polymerization of Propylene:

Propylene was polymerized in accordance with Polymerization Method 2 of Example 1 using the solid titanium trichloride catalyst obtained in Catalyst Preparation Method 2 of Example 32.
$R_p=3050$, IY=97.4

COMPARATIVE EXAMPLE 18

Propylene was polymerized in accordance with Polymerization Method 2 of Example 1 using Ball-Milled Catalyst (F) obtained in Catalyst Preparation Method 1 of Example 32.
$R_p=1480$, IY=94.1

EXAMPLE 33

(a) Catalyst Preparation Method 1:

Titanium Trichloride Composition (F) (34.0 g) prepared in Catalyst Preparation Method 1 of Example 30 was suspended in 170.0 cc of toluene, and 1 mole, per mole Titanium Trichloride Composition (F), of diisoamyl ether was added. They were treated at 60° C. for 1 hour.

After the treatment, the supernatant liquid was removed, and the residue was washed three times with 80 cc of hexane, dried and divided into small portions.

The resulting catalyst is designated Titanium Trichloride Composition (G).

(b) Catalyst Preparation Method 2:

Titanium Trichloride Composition (G) (20.0 g) obtained in Catalyst Preparation Method 1 of Example 33 was suspended in 100 cc of toluene, and 0.10 mole and 1.0 mole, respectively, per mole of Titanium Trichloride Composition (G), of iodine and diisoamyl ether were added. They were treated at 60° C. for 1 hour.

After the treatment, the supernatant liquid was removed, and the residue was washed twice with 30 cc of toluene and twice with 30 cc of hexane, dried, and divided into small portions.

Polymerization of Propylene:

Propylene was polymerized in accordance with Polymerization Method 2 of Example 1 using the solid titanium trichloride catalyst obtained in Catalyst Preparation Method 2 of Example 33.
$R_p=2880$, IY=97.0

COMPARATIVE EXAMPLE 19

Propylene was polymerized in accordance with Polymerization Method 2 of Example 1 using Titanium Trichloride Composition (G) obtained in Catalyst Preparation Method 1 of Example 33.
$R_p=2100$, IY=94.0

EXAMPLE 34

(a) Catalyst Preparation Method 1 [ball-mill treatment of Titanium Trichloride Composition (G)]:

Titanium Trichloride Composition (G) obtained in Catalyst Preparation Method 1 of Example 33 was ball-milled in accordance with Catalyst Preparation Method 1 of Example 19.

The resulting solid catalyst is designated Ball-Milled Catalyst (G).

(b) Catalyst Preparation Method 2:

Ball-Milled Catalyst (G) (13.3 g) obtained in Catalyst Preparation Method 1 of Example 34 was suspended in 63.2 cc of toluene, and 0.10 mole and 1.0 mole, respectively, per mole of Ball-Milled Catalyst (G), of iodine and diisoamyl ether were added. They were treated at 60° C. for 1 hour.

After the treatment, the supernatant liquid was removed, and the residue was washed twice with 30 cc of toluene and twice with 30 cc of hexane, dried, and divided into small portions.

Polymerization of Propylene:

Propylene was polymerized in accordance with Polymerization Method 2 of Example 1 using the solid titanium trichloride catalyst obtained in Catalyst Preparation Method 2 of Example 34.
$R_p=3200$, IY=97.2

COMPARATIVE EXAMPLE 20

Propylene was polymerized in accordance with Polymerization Method 2 of Example 1 using Ball-Milled Catalyst (G) obtained in Catalyst Preparation Method 1 of Example 34.
$R_p=1640$, IY=93.7

EXAMPLE 35

(a) Catalyst Preparation Method 1:

Powdery anhydrous aluminum chloride (15.0 g) was placed in a 100 cc flask together with 40 cc of well-dried xylene, and they were stirred. Then, hydrogen chloride gas was bubbled into the flask to dissolve the aluminum chloride completely.

Then, 8.8 g of the ether-treated solid prepared in Catalyst Preparation Method 1 of Example 25 was added, and the mixture was stirred at 60° C. for 2 hours.

After the treatment, the slurry was centrifuged to separate a titanium trichloride composition. The composition was washed five times with 50 cc of xylene at 70° C., and dried in vacuo.

The resulting titanium trichloride composition is designated Titanium Trichloride Composition (H).

(b) Catalyst Preparation Method 2:

Titamium Trichloride Composition (H), (7.0 g) obtained in Catalyst Preparation Method 1 of Example 35 was suspended in 35.0 cc of toluene, and 0.10 mole and 1.0 mole, respectively, per mole of Titamium Trichloride Composition (H), of iodine and diisoamyl ether were added. They were treated at 60° C. for 1 hour.

After the treatment, the supernatant liquid was removed, and the residue was washed three times with 20 cc of toluene, dried, and divided into small portions.

Polymerization of Propylene:

Propylene was polymerized in accordance with Polymerization Method 2 of Example 1 using the solid titanium trichloride catalyst obtained in Catalyst Preparation Method 2 of Example 35.
$R_p=2030$, IY=97.1

EXAMPLE 36

Titanium Trichloride Composition (H) (8.0 g) obtained in Catalyst Preparation Method 1 of Example 35 was suspended in 40 cc of toluene, and 0.5 mole and 1.0 mole, respectively, per mole of Titanium Trichloride Composition (H), of n-butyl iodide and diisoamyl ether were added. They were treated at 60° C. for 1 hour.

After the treatment, the product was washed, and dried to produce a solid titanium trichloride catalyst.

Propylene was polymerized in accordance with Polymerization Method 2 of Example 1 using the resulting solid titanium trichloride catalyst.
$R_p=1940$, IY=96.4

COMPARATIVE EXAMPLE 21

Propylene was polymerized in accordance with Polymerization Method 2 of Example 1 using Titanium Trichloride Composition (H) Prepared in Catalyst Preparation Method 1 of Example 35.
$R_p=1180$, IY=93.8

EXAMPLE 37

(a) Catalyst Preparation Method 1 [ball-mill treatment of Titanium Trichloride Composition (H)]:

Titanium Trichloride Composition (H) obtained in Catalyst Preparation Method 1 of Example 35 was ball-milled in accordance with Catalyst Preparation Method 1 of Example 19.

The resulting solid catalyst is designated Ball-Milled Catalyst (H).

(b) Catalyst Preparation Method 2:

Ball-Milled Catalyst (H) (11.1 g) obtained in Catalyst Preparation Method 1 of Example 37 was suspended in 55.5 cc of toluene, and 0.10 mole and 1.0 mole, respectively, per mole of Ball-Milled Catalyst (H), of iodine and diisoamyl ether were added. They were treated at 60° C. for 1 hour.

After the treatment, the supernatant liquid was removed, and the residue was washed twice with 30 cc of toluene and twice with 30 cc of heptane, dried, and divided into small portions for use in polymerization.

Polymerization of Propylene:

Using the solid titanium trichloride catalyst obtained in Catalyst Preparation Method 2 of Example 37, propylene was polymerized in accordance with Polymerization Method 2 of Example 1.
$R_p=2390$, IY=97.3

COMPARATIVE EXAMPLE 22

Propylene was polymerized in accordance with Polymerization Method 2 of Example 1 using Ball-Milled Catalyst (H) obtained in Catalyst Preparation Method 1 of Example 37.
$R_p=1240$, IY=93.7

EXAMPLE 38

(a) Catalyst Preparation Method 1:

Titanium Trichloride Composition (H) (10.1 g) prepared in Catalyst Preparation Method 1 of Example 35 was suspended in 50.5 cc of hexane, and 1 mole, per mole of Titanium Trichloride Composition (H), of diisoamyl ether was added. They were treated at 60° C. for 1 hour.

After the treatment, the supernatant liquid was removed, and the residue was washed three times with 30 cc of hexane, dried, and divided into small portions.

The resulting titanium trichloride composition is designated Titanium Trichloride Compoisiton (I).

(b) Catalyst Preparation Method 2:

Titanium Trichloride Composition (I) (12.0 g) was suspended in 60.0 cc of toluene, and 0.10 mole and 1.0 mole, respectively, per mole of the titanium trichloride composition, of iodine and diisoamyl ether were added. They were treated at 60° C. for 1 hour.

After the treatment, the supernatant liquid was removed, and the residue was washed twice with 30 cc of toluene and twice with 30 cc of hexane, dried, and divided into small portions.

Polymerization of Propylene:

Using the solid titanium trichloride catalyst obtained in Catalyst Preparation Method 2 of Example 38, propylene was polymerized in accordance with Polymerization Method 2 of Example 1.
$R_p=2120$, IY=96.5

COMPARATIVE EXAMPLE 23

Propylene was polymerized in accordance with Polymerization Method 2 of Example 1 using Titanium Trichloride Composition (I) obtained by Catalyst Preparation Method 1 of Example 38.
$R_p=1620$, IY=93.6

EXAMPLE 39

(a) Catalyst Preparation Method 1 [ball-mill treatment of Titanium Trichloride Composition (I)]:

Titanium Trichloride Composition (I) prepared in Catalyst Preparation Method 1 of Example 38 was ball-milled as described in Catalyst Preparation Method 1 of Example 19.

The resulting solid catalyst is designated Ball-Milled Catalyst (I).

(b) Catalyst Preparation Method 2:

Ball-Milled Catalyst (I) (11.9 g) was suspended in 59.5 cc of toluene, and 0.10 mole and 1.0 mole, respectively, per mole of Ball-Milled Catalyst (I), of iodine and diisoamyl ether were added. They were treated at 60° C. for 1 hour.

After the treatment, the supernatant liquid was removed, and the residue was washed twice with 30 cc of toluene and twice with 30 cc of hexane, dried and divided into small portions.

Polymerization of Propylene:

Propylene was polymerized in accordance with Polymerization Method 2 of Example 1 using the solid titanium trichloride catalyst obtained in Catalyst Preparation Method 2 of Example 39.
$R_p=2330$, IY=96.7

COMPARATIVE EXAMPLE 24

Propylene was polymerized in accordance with Polymerization Method 2 of Example 1 using Ball-Milled Catalyst (I) obtained in Catalyst Preparation Method 1 of Example 39.
$R_p=1440$, IY=93.0

EXAMPLE 40

(a) Catalyst Preparation Method 1:

The ether-treated solid (113 g) obtained in Catalyst Preparation Method 1 of Example 25 was added to a solution of 339 cc of heptane and 226 cc of titanium tetrachloride. They were treated at 70° C. for 2 hours.

After the treatment, the supernatant liquid was removed, and the residue was washed three times with 300 cc of hexane, dried, and divided into small portions.

The resulting titanium trichloride composition is designated Titanium Trichloride Composition (J).

(b) Catalyst Preparation Method 2:

Titanium Trichloride Composition (J) (14.4 g) was suspended in 72.0 cc of toluene, and 0.10 mole and 1.0 mole, respectively, per mole of Titanium Trichloride Composition (J), of iodine and diisoamyl ether were added. They were treated at 100° C. for 1 hour.

After the treatment, the supernatant liquid was removed, and the residue was washed twice with 30 cc of toluene and twice with 30 cc of hexane, dried, and divided into small portions.

Polymerization of Propylene:

Propylene was polymerized in accordance with Polymerization Method 2 of Example 1 using the solid titanium trichloride catalyst obtained in Catalyst Preparation Method 2 of Example 40.
$R_p=3010$, $IY=97.9$

COMPARATIVE EXAMPLE 25

Propylene was polymerized in accordance with Polymerization Method 1 of Example 1 using Titanium Trichloride Composition (J) obtained in Catalyst Preparation Method 1 of Example 40.
$R_p=2670$, $IY=97.7$

EXAMPLE 41

Titanium Trichloride Composition (J) (13.0 g) obtained in Catalyst Preparation Method 1 of Example 40 was suspended in 65 cc of toluene, and 0.5 mole and 1.0 mole, respectively, per mole of Titanium Trichloride Composition (J), of n-butyl iodide and diisoamyl ether were added. They were treated at 100° C. for 1 hour. After the treatment, the product was washed, and dried in a similar manner to that used in Example 1 to obtain a solid titanium trichloride catalyst.

Propylene was polymerized in accordance with Polymerication Method 2 of Example 1 using the titanium trichloride solid catalyst.
$R_p=2850$, $IY=97.9$

EXAMPLE 42

(a) Catalyst Preparation Method 1 [ball-mill treatment of Titanium Trichloride Composition (J)]:

Titanium Trichloride Composition (J) prepared in Catalyst Preparation Method 1 of Example 40 was ball-milled as described in Catalyst Preparation Method 1 of Example 19.

The resulting solid catalyst is designated Ball-Milled Catalyst (J).

(b) Catalyst Preparation Method 2:

Ball-Milled Catalyst (J) (12.2 g) was suspended in 61.0 cc of toluene, and 0.10 mole and 1.0 mole, respectively, per mole of Ball-Milled Catalyst (J), of iodine and diisoamyl ether were added. They were treated at 100° C. for 2 hours.

After the treatment, the supernatant liquid was removed, and the residue was washed twice with 30 cc of hexane and twice with 30 cc of heptane, dried, and divided into small portions.

Polymerization of Propylene:

Using the solid titanium trichloride catalyst obtained by Catalyst Preparation Method 2 of Example 42, propylene was polymerized in accordance with Polymerization Method 2 of Example 1.
$R_p=3240$, $IY=97.8$

COMPARATIVE EXAMPLE 26

Propylene was polymerized in accordance with Polymerization Method 2 of Example 1 using Ball-Milled Catalyst (J) obtained in Catalyst Preparation Method 1 of Example 42.
$R_p=2600$, $IY=97.4$

EXAMPLE 43

(a) Catalyst Preparation Method 1 (preparation of reduction product of titanium tetrachloride):

A 1-liter reactor was purged with argon, and then charged with 200 cc of dry hexane and 50 cc of titanium tetrachloride. The solution was maintained at −5° C.

Then, a solution of 150 cc of dry hexane and 116 cc of ethyl aluminum sesquichloride was added dropwise thereto. Under conditions such that the temperature of the reaction system was maintained at −3° C.

The mixture was stirred at this temperature for 2 hours.

After the reaction, the reaction mixture was allowed to stand, and the reduction product obtained was separated using a solid-liquid separating procedure. The separated product was washed twice with 200 cc of hexane, and thus, 80 g of the reduction product was obtained.

(b) Catalyst Preparation Method 2:

The reduction product obtained in Catalyst Preparation Method 1 of Example 43 was heat-treated as described in Catalyst Preparation Method 2 of Example 17.

The resulting titanium trichloride composition is designated Titanium Trichloride Composition (K).

(c) Catalyst Preparation Method 3:

Titanium Trichloride Composition (K) prepared in Catalyst Preparation Method 2 of Example 43 was treated with a mixture of iodine and diisoamyl ether in the same manner as in Catalyst Preparation Method 3 of Example 17 to obtained a solid titanium trichloride catalyst.

Polymerization of Propylene:

Propylene was polymerized in accordance with Polymerization Method 2 of Example 1 using the solid titanium trichloride catalyst obtained in Catalyst Preparation Method 3 of Example 43.
$R_p=2650$, $IY=97.0$

COMPARATIVE EXAMPLE 27

Propylene was polymerized in accordance with Polymerization Method 2 of Example 1 using Titanium Trichloride Composition (K) obtained in Catalyst Preparation Method 2 of Example 43.
$R_p=1090$, $IY=91.1$

EXAMPLE 44

(a) Catalyst Preparation Method 1 (preparation of the reduction product of titanium trichloride):

Titanium tetrachloride was reduced with ethyl aluminum sesquichloride under the same conditions as described in Catalyst Preparation Method 1 of Example 43 except that 5 mole %, based on the titanium tetrachloride, of iodine was present in the reaction system.

(b) Catalyst Preparation Method 2:

The reduction product obtained in Catalyst Preparation Method 1 of Example 44 was heat-treated in accordance with Catalyst Preparation Method 2 of Example 17.

The resulting titanium trichloride composition is designated Titanium Trichloride Composition (L).

(c) Catalyst Preparation Method 3:

Titanium Trichloride Composition (L) obtained in Catalyst Preparation Method 2 of Example 44 was treated with a mixture of iodine and diisoamyl ether in accordance with Catalyst Preparation Method 3 of Example 17 to obtain a solid titanium trichloride catalyst.

Polymerization of Propylene:

Propylene was polymerized in accordance with Polymerization Method 2 of Example 1 using the resulting solid titanium trichloride catalyst obtained in Catalyst Preparation Method 3 of Example 44.
$R_p=1230$, $IY=96.3$

COMPARATIVE EXAMPLE 28

Propylene was polymerized in accordance with Polymerization Method 2 of Example 1 using Titanium Trichloride Composition (L) obtained in Catalyst Preparation Method 2 of Example 44.

$R_p=602$, $IY=90.1$

COMPARATIVE EXAMPLE 29

The Titanium Trichloride Composition (L) was treated in the same manner as in Catalyst Preparation Method 3 of Example 44 except that iodine was not used.

Propylene was polymerized in accordance with Polymerization Method 2 of Example 1 using the resulting catalyst.

$R_p=700$, $IY=90.9$

EXAMPLE 45

The reaction product obtained in Catalyst Preparation Method 1 of Example 43 was treated with a mixture of iodine and diisoamyl ether as described in Catalyst Preparation Method 3 of Example 17, followed by washing and drying to obtain a solid titanium trichloride catalyst.

Using the resulting solid titanium trichloride catalyst, propylene was polymerized in accordance with Polymerization Method 2 of Example 1.

$R_p=2030$, $IY=96.0$

COMPARATIVE EXAMPLE 30

Using the reduction product obtained in Catalyst Preparation Method 1 of Example 43, propylene was polymerized in accordance with Polymerization Method 2 of Example 1.

$R_p=690$, $IY=72.0$

COMPARATIVE EXAMPLE 31-1

The reduction product obtained in Catalyst Preparation Method 1 of Example 43 was treated in the same manner as in Example 45 except that iodine was not used.

Using the resulting solid titanium trichloride catalyst, propylene was polymerized in accordance with Polymerization Method 2 of Example 1.

$R_p=740$, $IY=83.5$

COMPARATIVE EXAMPLE 31-2

The reduction product obtained in Catalyst Preparation Method 1 of Example 43 was treated in the same manner as in Example 45 except that diisoamyl ether was not used.

Using the resulting solid titanium trichloride catalyst, propylene was polymerized in accordance with Polymerization Method 2 of Example 1.

$R_p=643$, $IY=76.5$

EXAMPLE 46

The reduction product obtained in Catalyst Preparation Method 1 of Example 17 was treated with a mixture of n-butyl iodide and diisoamyl ether in accordance with the procedures in Example 18.

Using the resulting solid titanium trichloride catalyst, propylene was polymerized in accordance with Polymerization Method 2 of Example 1.

$R_p=950$, $IY=90.0$

COMPARATIVE EXAMPLE 32

Titanium Trichloride Composition (A) was treated in the same manner as in Example 18 except that chloroform was used instead of the n-butyl iodide.

Using the resulting solid titanium trichloride catalyst, propylene was polymerized in accordance with Polymerization Method 2 of Example 1.

$R_p=910$, $IY=94.0$

While the invention has been described in detail and with reference to specific embodiments thereof, it will be apparent to one skilled in the art that various changes and modifications can be made therein without departing from the spirit and scope thereof.

What is claimed is:

1. A method for preparing a solid titanium trichloride catalyst, which comprises treating at about $-30°$ to about $200°$ C. for about 5 minutes to about 5 hours a titanium trichloride composition or a pulverized product thereof with a mixture of (1) about 0.001 to about 2.0 moles per mole of titanium chloride in the titanium trichloride composition of at least one halogen or halogen compound selected from the group consisting of (a) a halogen expressed by the general formula $X_2$ wherein X represents Cl, Br or I, (b) an interhalogen compound expressed by the general formula $XX'_a$ wherein X and X', which are different, each represents Cl, Br or I, and a is 1 or 3, and (c) an iodinated hydrocarbon compound expressed by the general formula $R_3$—I wherein $R_3$ represents a straight-chain or branched-chain alkyl group containing 2 to 18 carbon atoms, and (2) about 0.001 to about 5.0 moles per mole of titanium trichloride in the titanium trichloride composition of an ether compound expressed by the general formula $R_1$—O—$R_2$ wherein $R_1$ and $R_2$, which may be the same or different, each represents a straight-chain or branched-chain alkyl group containing 1 to 8 carbon atoms.

2. The method of claim 1, wherein the titanium trichloride composition is a titanium trichloride composition expressed by the general formula $TiCl_3(AlCl_3)_{\frac{1}{3}}$ prepared by reducing titanium tetrachloride with metallic aluminum to obtain a reduction product and ball-milling the reduction product.

3. The method of claim 1, wherein the titanium trichloride composition is a titanium trichloride composition prepared by reducing titanium tetrachloride with an organoaluminum compound expressed by the general formula $$R_nAlZ_{3-n}$$

wherein R represents a straight-chain or branched-chain alkyl group, an alicyclic hydrocarbon group or an aromatic hydrocarbon group, each containing up to 18 carbon atoms, Z represents a halogen atom or a hydrocarbon atom, and n is a number of from 1 to 3.

4. The method of claim 3, wherein said method additionally includes heat-treating the resulting product at a temperature of about 100° to about 180° C. in the absence of or presence of an inert hydrocarbon.

5. The method of claim 1, wherein the titanium trichloride composition is a titanium trichloride composition prepared by reducing titanium tetrachloride with an organoaluminum compound expressed by the general formula $$R_nAlZ_{3-n}$$

wherein R represents a straight-chain or branched-chain alkyl group, an alicyclic hydrocarbon group or an aromatic hydrocarbon group, each containing up to 18 carbon atoms, Z represents a halogen atom or a hydrogen atom and n is a number of from 1 to 3, and treating the reduction product with an aluminum compound expressed by the general formula $$R''_pAlX_{3-p}$$

wherein R'' represents a straight-chain or branched-chain alkyl group, an alicyclic hydrocarbon group or an aromatic hydrocarbon group, each containing up to 18 carbon atoms, X represents a halogen atom, and p is a number defined by $1 \leq p < 1.5$.

6. The method of claim 5, wherein said method additionally includes treating at about 0° to about 100° C. the resulting product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms.

7. The method of claim 1, wherein the titanium trichloride composition is a titanium trichloride composition prepared by reducing titanium tetrachloride with an organoaluminum compound expressed by the general formula $$R_nAlZ_{3-n}$$

wherein R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3, treating at about 0° to about 100° C. the resulting product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms, and treating at room temperature to about 200° C. for about 30 minutes to about 5 hours the resulting treated solid with an aluminum compound expressed by the general formula $$R''_pAlX_{3-p}$$

wherein R'' represents a straight-chain or branched-chain alkyl group, an alicyclic hydrocarbon group or an aromatic hydrocarbon group, each containing up to 18 carbon atoms, X represents a halogen atom, and p is a number defined by $1 \leq p < 1.5$.

8. The method of claim 7, wherein said method additionally includes treating at about 0° to about 200° C. the resulting product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms.

9. The method of claim 1, wherein the titanium trichloride composition is a titanium trichloride composition prepared by reducing titanium tetrachloride with an organoaluminum compound expressed by the general formula $$R_nAlZ_{3-n}$$

wherein R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3, treating at about 0° to about 100° C. the reduction product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms, and treating at room temperature to about 200° C. for about 30 minutes to about 5 hours the ether-treated solid with an aluminum compound expressed by the general formula $$R''_pAlX_{3-p}$$

wherein R'' represents a straight-chain or branched-chain alkyl group, an alicyclic hydrocarbon group or an aromatic hydrocarbon group, each containing up to 18 carbon atoms, X represents a halogen atom, and p is a number defined by $1 \leq p < 1.5$, in the presence of an organic halogen compound expressed by the general formula $$R'''X$$

wherein R''' represents a straight-chain or branched-chain alkyl group, an alicyclic hydrocarbon group, or an aromatic hydrocarbon group, each containing up to 18 carbon atoms, and X represents a halogen atom.

10. The method of claim 9, wherein said method additionally includes treating at about 0° to about 100° C. the resulting product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms.

11. The method of claim 1, wherein the titanium trichloride composition is a titanium trichloride composition prepared by reducing titanium tetrachloride with an organoaluminum compound expressed by the general formula $$R_nAlZ_{3-n}$$

wherein R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3, treating at about 0° to about 100° C. the reduction product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms, and treating at about $-100°$ to about 200° C. for about 5 minutes to about 5 hours the ether-treated solid with an aluminum halide expressed by the general formula $$AlX_3$$

wherein X represents a halogen atom, dissolved in an aromatic hydrocarbon in the presence of a hydrogen halide expressed by the general formula $$HX$$

wherein X represents a halogen atom.

12. The method of claim 11, wherein said method additionally includes treating at about 0° to about 100° C. the resulding product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms.

13. The method of claim 1, wherein the titanium trichloride composition is a titanium trichloride composition prepared by reducing titanium tetrachloride with an organoaluminum compound expressed by the general formula $$R_nAlZ_{3-n}$$

wherein R represents a straight-chain or branched-chain alkyl group, an alicyclic hydrocarbon group or an aromatic hydrocarbon group, each containing up to 18 carbon atoms, Z represents a halogen atom or a hydrogen atom, and n is a number of from 1 to 3, treating at about 0° to about 100° C. for about 30 minutes to about 4 hours the reduction product with about 0.05 to about 3.0 moles per mole of titanium trichloride of an ether compound expressed by the general formula $$R_1-O-R_2$$

wherein $R_1$ and $R_2$, which may be the same or different, each represents a straight-chain or branched-chain alkyl group containing 1 to 8 carbon atoms, treating at room temperature to about 100° C. for about 30 minutes to about 4 hours the ether-treated solid with titanium tetrachloride.

14. The method of claim 1, wherein the iodinated hydrocarbon compound is n-butyl iodide.

15. The method of claim 1, wherein the halogen is $I_2$.

16. The method of claim 1, wherein the ether compound (2) is di-n-butyl ether or diisoamyl ether.

17. The method of claim 6, wherein the ether compound is di-n-butyl ether or diisoamyl ether.

18. The method of claim 7, wherein the ether compound is di-n-butyl ether or diisoamyl ether.

19. The method of claim 8, wherein the ether compound is di-n-butyl ether or diisoamyl ether.

20. The method of claim 9, wherein the ether compound is di-n-butyl ether of diisoamyl ether.

21. The method of claim 10, wherein the ether compound is di-n-butyl ether or diisoamyl ether.

22. The method of claim 11, wherein the ether compound is di-n-butyl ether or diisoamyl ether.

23. The method of claim 12, wherein the ether compound is di-n-butyl ether or diisoamyl ether.

24. The method of claim 13, wherein the ether compound is di-n-butyl ether or diisoamyl ether.

25. The method of claim 5, wherein the aluminum compound expressed by the general formula $R''_pAlX_{3-p}$ is an alkyl aluminum dichloride.

26. The method of claim 7, wherein the aluminum compound expressed by the general formula $R''_pAlX_{3-p}$ is an alkyl aluminum dichloride.

27. The method of claim 9, wherein the aluminum compound expressed by the general formula $R''_pAlX_{3-p}$ is an alkyl aluminum dichloride.

28. The method of claim 9, wherein the organic halogen compound is an organic halogen compound containing an alkyl group or an aralkyl group.

29. The method of claim 11, wherein the aluminum halide is aluminum chloride.

30. The method of claim 1, wherein the amount of the halogen compound is 0.005 to 1.0 mole per mole of titanium trichloride in the titanium trichloride composition.

31. The method of claim 1, wherein the amount of the ether compound is 0.005 to 3.0 moles per mole of titanium trichloride in the titanium trichloride composition.

32. The method of claim 1 wherein said treating comprises bringing the titanium chloride into contact with said mixture and after said treating separating the resulting solid by washing and filtration.

33. The method of claim 1 wherein said halogen or halogen compound is (a).

34. The method of claim 2 wherein said halogen or halogen compound is (b).

* * * * *